United States Patent
Spatafora

[19]
[11] Patent Number: 5,927,467
[45] Date of Patent: Jul. 27, 1999

[54] PRODUCT ALIGNER DEVICE, IN PARTICULAR FOR ITEMS FED TO A MANUFACTURING MACHINE

[75] Inventor: Mario Spatafora, Bologna, Italy

[73] Assignee: Azionaria Costruzioni Macchine Automatiche A.C.M.A. S.p.A., Bologna, Italy

[21] Appl. No.: 08/851,550

[22] Filed: May 5, 1997

[30] Foreign Application Priority Data

May 6, 1996 [IT] Italy .................................. BO96A0241
Dec. 5, 1996 [IT] Italy .................................. BO96A0634

[51] Int. Cl.[6] .................................................. B65G 47/24
[52] U.S. Cl. ........................................... 198/392; 198/757
[58] Field of Search ....................................... 198/392, 757

[56] References Cited

U.S. PATENT DOCUMENTS

| 2,065,319 | 12/1936 | Lewis . | |
|---|---|---|---|
| 3,635,325 | 1/1972 | Sterling . | |
| 3,674,128 | 7/1972 | Mead | 198/392 |
| 5,400,893 | 3/1995 | Spatafora | 198/392 X |
| 5,804,772 | 9/1998 | Wooldridge et al. | 198/757 X |

FOREIGN PATENT DOCUMENTS

| 123716 | 5/1988 | Japan | 198/392 |
|---|---|---|---|
| 1 384 152 | 2/1975 | United Kingdom . | |
| 2088312 | 6/1982 | United Kingdom . | |
| 2 231 559 | 11/1990 | United Kingdom . | |

*Primary Examiner*—James R. Bidwell
*Attorney, Agent, or Firm*—Pillsbury Madison & Sutro LLP

[57] ABSTRACT

Products advancing en masse, typically candy or chocolates, are aligned by a device comprising a drum, and inside the drum, a rotating disc by which the products are taken up from an infeed belt, aligned and oriented exploiting centrifugal force and directed onto a conveyor belt extending toward a wrapping machine; the top surface of the rotating disc incorporates an upwardly directed portion of concave profile serving to establish a path along which the effects of centrifugal force on the advancing products are suitably counteracted and controlled.

11 Claims, 6 Drawing Sheets

PRODUCT ALIGNER DEVICE, IN PARTICULAR FOR ITEMS FED TO A MANUFACTURING MACHINE

BACKGROUND OF THE INVENTION

The present invention relates to a product aligner device, in particular for items fed to a manufacturing machine.

In particular, the present invention finds application in the industrial manufacture of edible products, for example candy and chocolates and the like, where the device is employed advantageously for the purpose of feeding such products toward wrapping machines albeit any specific reference made herein to this type of use implies no limitation in scope.

It is a conventional practice within the art field of manufacturing edible products to make use of aligner devices by which discrete items advancing in a random flow are taken up, suitably ordered and oriented, and conveyed along a feed path toward a wrapping machine.

In a first version, such aligner devices are composed essentially of a drum, and, located within the drum, a disc rotatable about a substantially vertical axis.

The disc present a flat and horizontal top surface and is circumscribed by the walls of the drum, which are substantially cylindrical and concentric with the disc, and rotatable about a corresponding axis angled marginally in relation to the axis of rotation of the disc.

The disc and the walls of the drum rotate at suitably coordinated angular velocities, and are associated mutually in such a way as to establish paths along which products directed en masse onto the top surface of the disc are aligned, oriented uniformly and caused to advance progressively, singly and in ordered succession, under the impetus of the centrifugal force to which they become subject through direct contact with the surface of the disc and with the walls of the drum.

Aligner devices of conventional type as outlined above are entirely functional and efficient; when connected up to modern wrapping machines typified by notably high operating speeds, however, the angular velocity of the disc has to increase significantly, and the resulting centrifugal forces are of an intensity such that the products tend to bunch against the walls of the drum, around the periphery of the disc. Consequently, the products are unable to align correctly.

This drawback is heightened in situations where the disc is not altogether flat, but embodied with a convex surface designed to accentuate the effect of the centrifugal force on the products.

In a second version, product aligner devices of the type in question generally comprise a disc rotatable about a substantially vertical axis and affording a top surface onto which the products are deposited en masse.

The disc is caused to rotate at a speed such that the centrifugal force acting on the single product will never exceed the frictional force existing between the product and the disc, whatever the position occupied by the product on the top surface.

Each product deposited on the disc is made to advance along a circular path presenting fixed obstacles by which it is intercepted and diverted onto successive substantially circular paths of increasingly greater radius, to the point ultimately of passing onto a path that extends around the periphery of the disc. In the course of its progress around the peripheral path, the product is diverted onto an outfeed conveyor running substantially tangential to the disc.

As a result of the frictional contact with the surface of the disc and the action of the fixed obstacles, the products deposited onto the disc en masse are aligned, uniformly oriented and advanced progressively one by one in such a way as to pass onto the outfeed conveyor in orderly single file.

Aligner devices of this second type are again entirely functional and efficient; when connected up to modern wrapping machines typified by notably high operating speeds, however, the angular velocity of the disc must increase significantly, and the resulting centrifugal forces are of an intensity such as to outbalance the frictional force existing between the product and the disc, causing the products to become detached from the surface of the disc and bunch in disorderly fashion on the path extending around the periphery of the disc.

The drawback in question is heightened in the event of there being a low coefficient of friction between the products and the surface of the disc.

The object of the present invention is to provide a product aligner device which, unlike the conventional devices described above, will allow of controlling the centrifugal forces acting on products supported by and in movement over the surface of the disc.

SUMMARY OF THE INVENTION

The stated object is realized according to the present invention in a product aligner device, in particular for items fed to a manufacturing machine, of the type by which a flow of products is received, aligned and suitably oriented, and directed toward a manufacturing machine, typically a wrapping machine.

Such a device comprises a drum, and internally of the drum, a disc rotatable about a substantially vertical axis, affording a top surface on which products are taken up and through the agency of centrifugal force aligned and oriented and directed toward an outfeed station, infeed means by which the products are deposited on the top surface of the rotating disc, and conveyor means affording an outfeed path that extends from the outfeed station toward the manufacturing machine.

To advantage, at least one portion of the top surface presented by the disc exhibits an upwardly directed concave profile establishing a path along which the effects of centrifugal force on the products in movement over the top surface are counteracted and controlled.

BRIEF DESCRIPTION OF THE DRAWINGS

The invention will now be described in detail, by way of example, with the aid of the accompanying drawings, in which:

FIG. 1a illustrates an enlarged detail of the device, viewed in a fragmentary side elevation taken on II—II of FIG. 1;

FIG. 6a illustrates an enlarged detail of the device, viewed in a fragmentary side elevation taken on II—II of FIG. 6;

DESCRIPTION OF THE PREFERRED EMBODIMENTS

Figure 1:
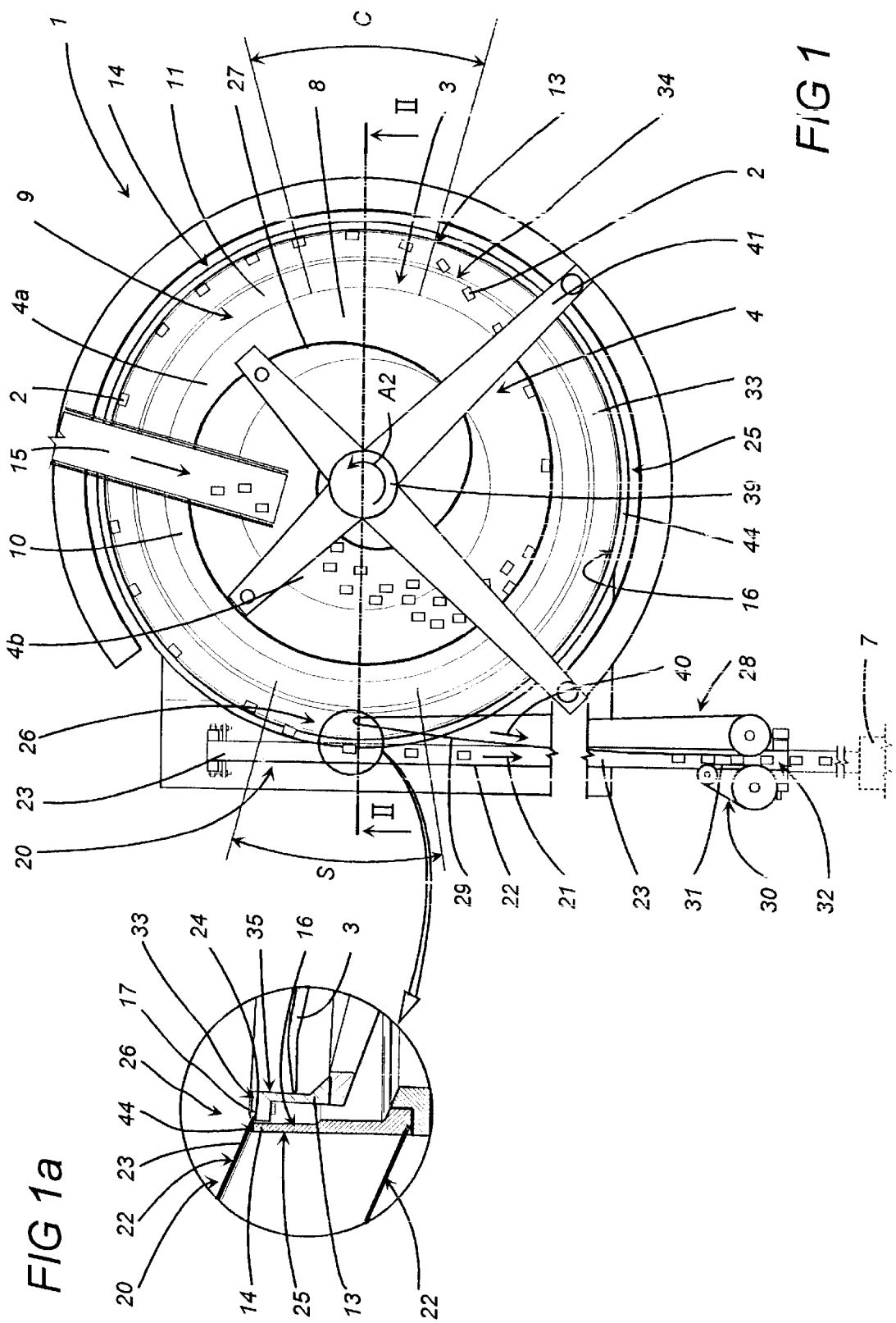
FIG. 1 illustrates a first version of the device according to the present invention, in a schematic plan view.
Figure 2:
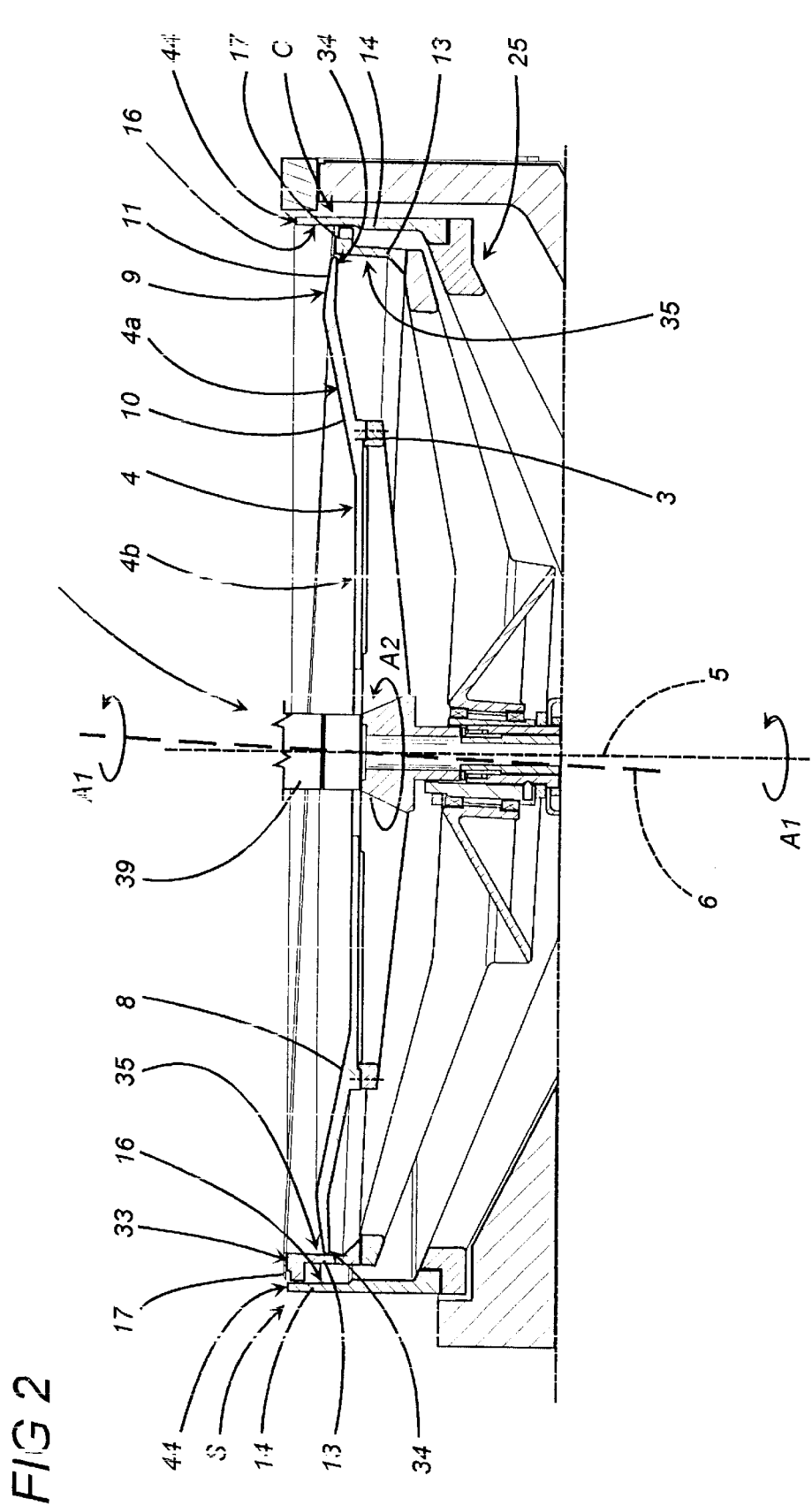
FIG. 2 is an axial section on II—II of FIG. 1, in which certain parts are omitted.

Referring to FIGS. 1 and 2 of the accompanying drawings, 1 denotes a product aligner device, in its entirety, comprising a drum 25 into which a stream of products 2, in particular chocolates, is directed en masse by way of an infeed belt 15; once inside the drum 25, the products 2 become subject to centrifugal force and are aligned, oriented and finally directed by way of an outfeed station 26, through the agency of conveyor means 20, onto an outfeed path 21 extending toward a manufacturing machine denoted 7 (typically a wrapping machine) which is illustrated schematically in phantom lines.

The drum 25 presents a peripheral wall 16 afforded by two essentially cylindrical annular bodies 13 and 14, coupled together circumferentially one internally of the other. The inner annular body 13 is rotatable thus about a corresponding axis 6 angled marginally away from the vertical, whilst the outer annular body 14 is rotatable about a vertical axis 5 (see FIG. 2).

The two annular bodies 13 and 14 are driven synchronously in rotation, in such a way as to revolve at the same angular velocity A1.

Also forming part of the device is a rotating disc 3, located internally of the drum 25 and affording a top surface 4 positioned to receive the products 2 to be aligned and oriented. The disc 3 is disposed coaxially with and encompassed peripherally by the outer annular body 14, and rotatable about the vertical axis 5 at a predetermined angular velocity A2 greater than or in any event equal to the angular velocity A1 of the two annular bodies 13 and 14.

The internal annular body 13 presents a top annular surface 33 that combines in conventional manner with the remaining annular body 14, and in particular with the peripheral wall 16 and the top annular surface 44 of this same body 14, to define a first path extending circumferentially around the drum 25 along which the products 2 are directed in orderly single file.

The internal annular body 13 also presents a lateral inner surface 35 surrounding the peripheral rim 34 of the disc 3 and combining with the top surface 4 of the disc 3 in conventional manner to establish a second circumferential path followed by the products 2.

The first circumferential path is inclined in relation both to the second circumferential path and to the outfeed path 21 and, by reason of the misalignment between the annular bodies 13 and 14, in such a way as to establish a first junction between the first and second circumferential paths and a second junction between the first circumferential path and the outfeed path 21.

The outer annular body 14 is positioned with the top annular surface 44 elevated in relation to the top surface 4 of the disc 3, whereas the positioning of the inner annular body 13 is such, by reason of its inclination, that the top annular surface 33 affords a first zone or entry zone C discernible on the right of FIGS. 1 and 2, disposed substantially on a level with the top surface 4 of the disc 3, and a second zone or exit zone S, discernible on the left of FIGS. 1 and 2, situated diametrally opposite to the first zone C and level with the top annular surface 44 of the annular body 14.

The top surface 4 of the disc 3 is profiled in such a way as will allow of controlling the law of motion whereby the products 2, after being released from the infeed belt 15 onto a substantially central area of the disc 3 when the aligner device 1 is in operation, are caused to move across the surface from the center to the periphery under the impetus of the centrifugal forces generated by rotation of the disc 3.

More exactly, the top surface 4 exhibits a profile of geometry designed to generate forces counteracting the centrifugal force and thus to modify the resultant of these same forces, thereby minimizing the impact on the products 2 when directed against the lateral inner surface 35 of the inner annular body 13, and ensuring that any increase in angular velocity of the disc 3, occasioned when adapting to the high operating speeds of machines with which the device 1 is associated, will not adversely affect the operation of the device itself in terms of ordering and aligning the products.

Given that the resultant of the forces acting on the products 2 will depend on many parameters, it is not possible arbitrarily to define a unique shape for the top surface 4 of the disc 3 that will be suitable for every situation encountered in practice. For example, the magnitude of the masses in play and the operating speeds demanded of the device 1 are factors compounded further by variations in the coefficient of sliding friction between the product 2 and the top surface 4 of the disc 3, which is dependent both on the physical nature of the surfaces engaged in mutual contact, and on operating temperatures.

Consequently, the top surface 4 of the disc 3 might exhibit numerous different embodiments, all of which however will afford a path 8 along which the movement of the products 2 across the disc 3 can be controlled in the manner aforementioned.

Certain possible embodiments for the top surface 4 of the disc 3 are indicated by way of example in FIGS. 2, 3, 4 and 5.

Observing these same examples, it will be noted that the top surface 4 of the disc 3 presents at least one portion, denoted 4a in each instance, with an upwardly directed concave profile.

In the case of FIG. 2, the top surface 4 of the disc 3 presents a portion 4b disposed adjacent to the axis of rotation 5 of the disc, of which the profile appears substantially horizontal and flat. The flat portion 4b and the upward facing concavely profiled portion 4a are joined without any break in continuity. In this particular example, viewing the disc 3 in a diametral section, the concave portion 4a presents a profile comprising a rectilinear leg 10.

Figure 3:
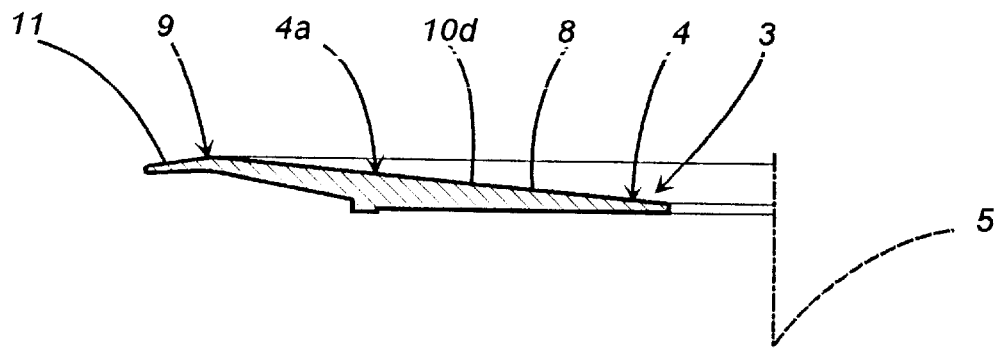
FIGS. 3, 4 and 5 are partial sections illustrating possible embodiments of a detail of the device as in FIGS. 1 and 2, shown by way of example and implying no limitation.
Figure 4:
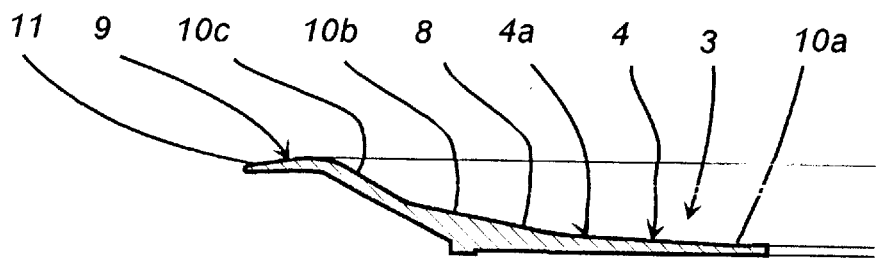

As indicated in FIG. 3, the top surface 4 of the disc 3 could also be shaped in such a manner as to present a sectional profile that comprises a single rectilinear leg 10d, angled upwards toward the periphery. In this instance the portion 4a of concave profile occupies substantially the entire top surface 4 of the disc 3.

In the example of FIG. 4, which again shows the disc 3 in a diametral section, the top surface 4 presents a portion 4a of concave profile comprising a succession of mutually angled rectilinear legs 10a, 10b and 10c. The farther the rectilinear leg is located from the rotational axis 5 of the disc 3, the steeper its angle of inclination becomes, so that in practice, the leg denoted 10c is angled more steeply than the preceding leg 10b, which in turn is angled more steeply than the leg denoted 10a.

Figure 5:
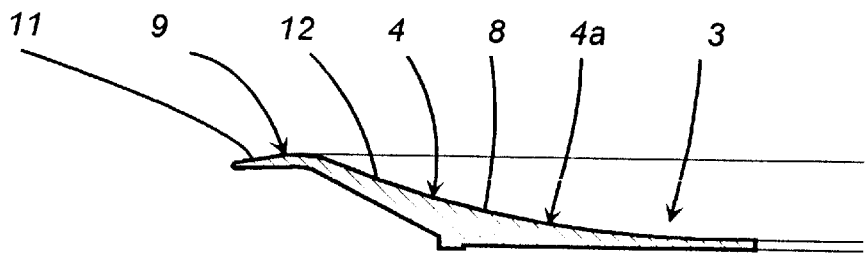

Finally, in the example of FIG. 5, the top surface 4 of the disc 3 comprises a concave portion 4a presenting a profile of which at least one part is a curve 12.

Where the concave portion 4a exhibits a curvilinear profile, the curve 12 can be circular, polycentric, parabolic, elliptical or hyperbolic. Likewise in this instance, the curve 12 establishes a path 8 that will function as a means of controlling the law of motion imposed on products 2 invested with centrifugal force.

In all the embodiments described and illustrated thus far the top surface 4 of the disc 3 may present a peripheral portion 9 that is joined to the upward facing concavely profiled portion 4a with no break in continuity. The profile of the peripheral portion 9, seen in section, comprises a leg 11 inclined downward toward the periphery. This allows the final stage of the path 8 to be shaped in such a way as will favor and ease the passage of the products 2 from the top surface 4 of the disc 3 to the top annular surface 33 of the inner annular body 13.

Naturally there are possibilities for numerous other variations in embodiment of the profiles in question, obtainable by combining the essential shapes described and illustrated to suitable advantage.

Referring again to FIG. 1, the aligner device 1 further comprises a vertically disposed wall 27 of spiral geometry, and a cylindrical hub 39 with radial arms 41 by which the wall 27 is carried above the disc 3. The spiral wall 27, conventional in principle, is designed to cooperate with the disc 3 in aligning and orienting the products 2, functioning as a restraint and as a means of counteracting centrifugal forces.

As to the conveyor means 20, these are indicated in FIG. 1 as comprising, in particular, a looped conveyor belt 22 extending along the outfeed path 21 and toward the manufacturing machine 7. The belt 22 presents a transport branch 23 coupled to the outfeed station 26 of the drum 25 in such a way that products 2 aligned and oriented by the disc 3 can be taken up smoothly from the top surface 44 of the outer annular body 14.

As indicated in the detail of FIG. 1a, the transport branch 23 of the conveyor belt 22 is angled relative to the top annular surfaces 33 and 44 of the inner and outer annular bodies 13 and 14, in such a manner that products 2 leaving the drum 25 will be made to follow an ascending or parabolic path. More precisely, the transport branch 23 of the belt 22 operates with one side edge 24 located permanently between converging peripheral elements of the drum 25, which in FIG. 1a are indicated as being the top annular surface 44 of the outer annular body 14 and a lip 17 projecting radially from the inner annular body 13 toward the outer annular body 14.

The conveyor means 20 further comprise a first belt loop 28 with a conveying branch 29 suspended above the conveyor belt 22 and advancing in the direction of the arrow denoted 40, by which the products 2 are engaged laterally.

The conveying branch 29 of the first belt loop 28 occupies a plane substantially perpendicular to the transport branch 23 of the conveyor belt 22, in such a way that the two branches operate in conjunction to align the products 2 along the outfeed path 21.

A second belt loop 30, positioned to one side of the outfeed path 21 at the runout end 32 of the conveyor belt 22, affords a conveying branch 31 disposed facing the corresponding branch 29 of the first belt loop 28 and shorter by comparison. The function of the second belt loop 30, operating in conjunction with the first belt loop 28, is to take up the aligned and oriented products 2 from the runout 32 of the conveyor belt 22 and advance them toward the manufacturing machine 7.

A second version of the aligner device according to the invention is illustrated in FIGS. 6 to 11.

Figure 6:
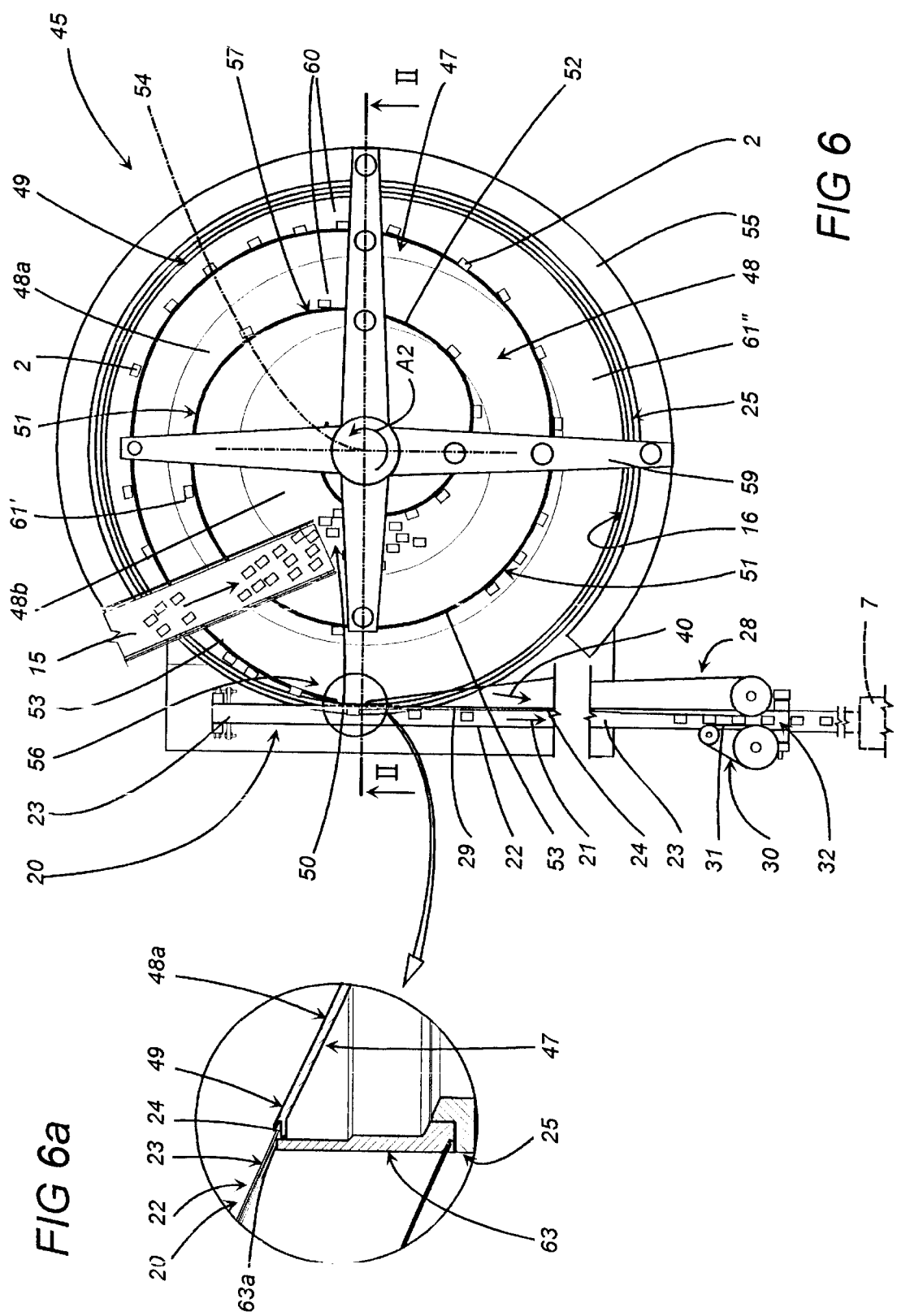
FIG. 6 illustrates a second version of the device according to the present invention, in a schematic plan view.
Figure 7:
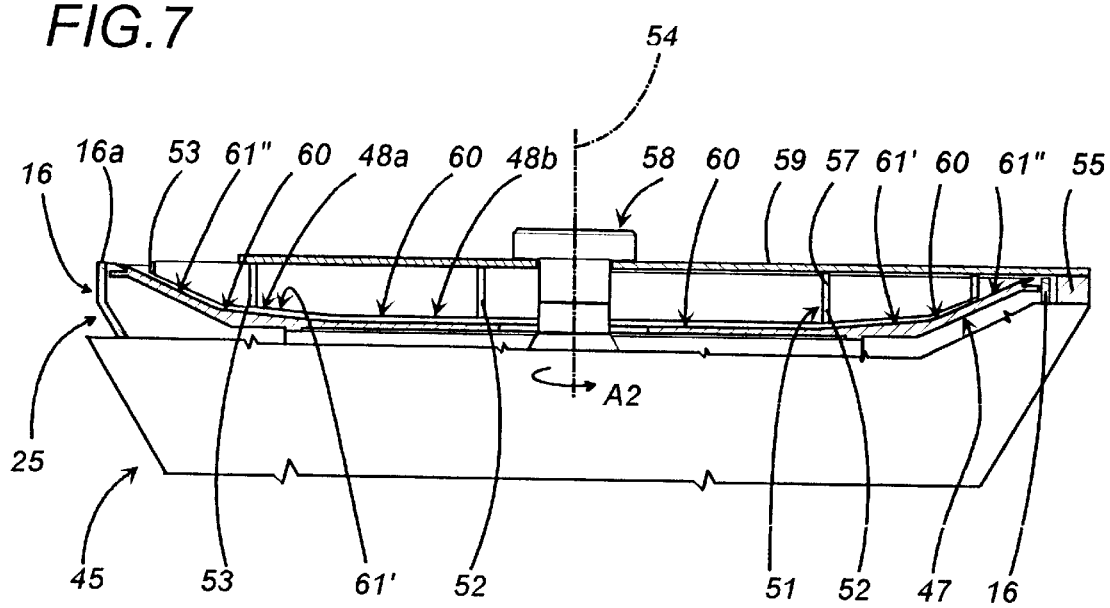
FIG. 7 is an axial section on II—II of FIG. 6, in which certain parts are omitted.

Referring to FIGS. 6 and 7 of the drawings, 45 denotes a product aligner device in its entirety, comprising a drum 55, and housed internally of the drum, a disc 47 rotatable about an axis 54 at a predetermined angular velocity A2. The disc 47 affords a top surface 48 onto which products 2, in particular a flow of chocolates advancing en masse, are directed by way of an infeed belt 15; the products 2 are aligned and oriented on the surface 48 with the aid of centrifugal force, then taken by way of an outfeed station 56 and through the agency of conveyor means 20 onto an outfeed path 21 extending toward a manufacturing machine 7 (typically a wrapping machine) which is illustrated schematically in phantom lines.

The top surface 48 of the disc 47 is profiled in such a way as will allow of controlling the law of motion whereby the products 2, released by the infeed belt 15 at a predetermined discharge point 50 that coincides with a substantially central part of the disc 47, are caused to move across the surface 48 from the center toward a peripheral portion 49 under the impetus of the centrifugal forces generated by rotation of the disc 47.

More exactly, the top surface 48 exhibits a profile similar in all respects to the top surface 4 of the disc 3 already described, designed to generate forces counteracting the centrifugal force and thus to modify the resultant of these same forces, thereby preventing the escape of products 2 from the surface 48 of the disc 47 and ensuring that any increase in the angular velocity of the disc 47, occasioned when adapting to the high operating speeds of machines with which the device 45 is associated, will not adversely affect the operation of the device itself in terms of ordering and aligning the products 2.

In the case of products 2, for example, which have a low coefficient of friction with respect to the top surface 48 of the disc 47, such products will tend naturally to move into correct alignment under the favorable conditions afforded typically at low speeds or rotation, for instance during the transition from standstill to full speed, whereas limited grip brings problems with stability at higher speeds of rotation, typically when the disc 47 is up to normal operating tempo, despite the top surface 48 being profiled in such a way as to counteract the resulting centrifugal forces, since even a strong counteracting force may not be sufficient to prevent the products 2, invested with considerable centrifugal energy, from bunching toward the peripheral portion 49 of the disc 47.

Conversely, where products 2 are characterized by a high coefficient of friction with respect to the top surface 48 of the disc 47, their freedom of movement and correct alignment on the surface are affected both at low and at high speeds of rotation. In effect, even at a high speed of rotation and with a top surface 48 profiled in such a way as will generate counteracting forces strong enough to offset the high centrifugal forces in play, it must be remembered that these same counteracting forces are added to the counteracting forces generated by the high coefficient of friction between the product and the top surface 48, producing a resultant counteracting force of which the effect on the products 2 is to prevent them from advancing in ordered and correct alignment on the disc 47.

Thus, the solution of embodying the top surface 48 of the disc 47 with a concave profile designed to oppose centrifugal force may not cover all eventualities, as the effect obtained may be inadequate when handling products 2 with a low coefficient of friction, whereas the effect on products 2 with a high coefficient of friction may be excessive, to the point of preventing their correct movement.

It is therefore not possible arbitrarily to establish a unique shape for the top surface 48 of the disc 47 that will be suitable for every situation encountered in practice.

Figure 8:
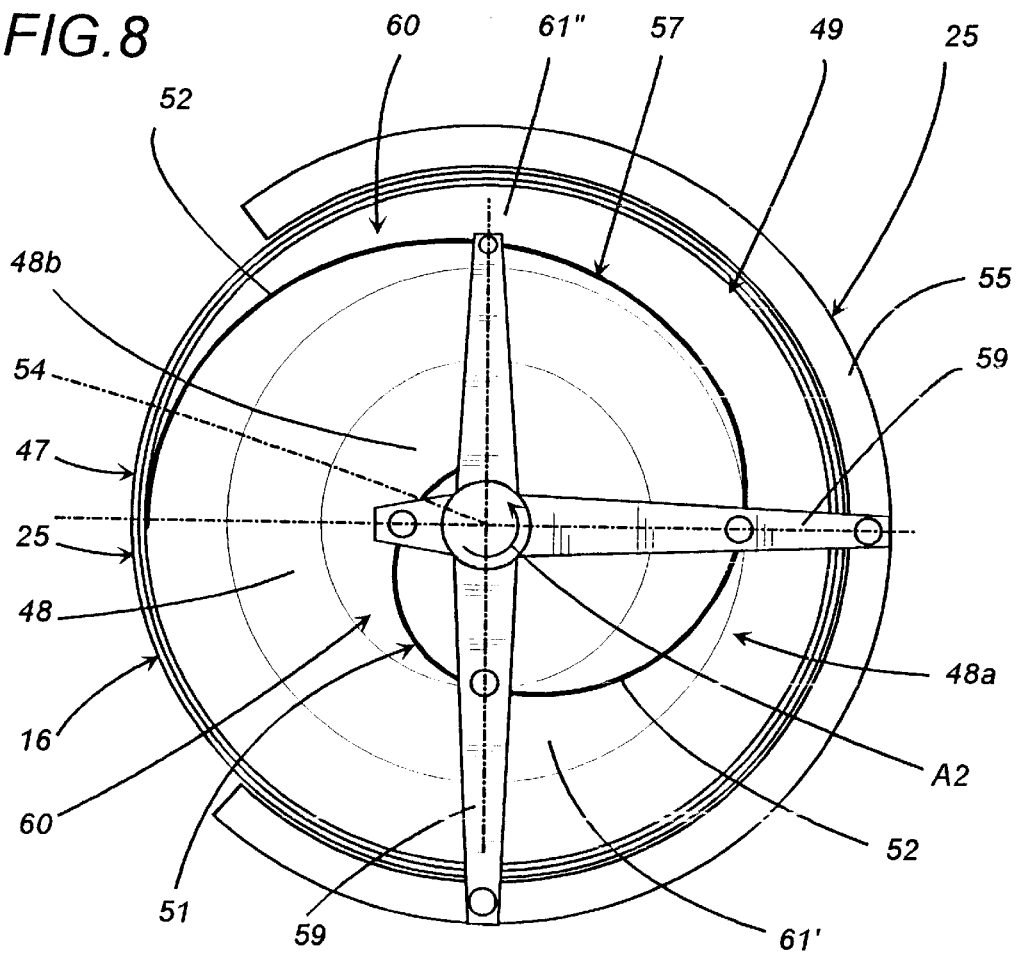
FIG. 8 shows the device of FIG. 6 in a schematic and partial plan view, with a detail of the device seen in a possible alternative embodiment.

In view of this particular circumstance, the aligner device 45 also comprises means 51 by which to divert and guide the products 2, operating in conjunction with the disc 47 and extending along a substantially spiral course that departs from the discharge point 50 and terminates at the outfeed station 56. Such guide means 51 consist in a continuous wall 57 of spiral geometry, vertically disposed and supported above the disc 47 by a cylindrical hub 58 with radial arms 59 which in turn are supported by an outer frame 55. The wall 57 establishes a path 60 on the top surface 48 of the disc 47, winding around the axis of rotation 54 with a progressively increasing radius of curvature, and is instrumental in ensuring that the products 2 are advanced and ordered along the path 60 whatever the rotational speed of the disc 47. The wall 57 may describe a single coil 52 on the top surface 48 of the disc 47 as indicated in FIG. 8 or a plurality of coils, for example two as illustrated in FIG. 6, where the two consecutive coils are denoted 52 and 53. In the event of the wall 57 incorporating two coils 52 and 53, the developable length of the path 60 in relation to the surface 48 of the disc 47 will be greater by reason of its winding twice around the axis of rotation 54.

Thanks to the combination of the spiral wall 57 and the selectively contoured profile presented by the top surface 48 of the disc 47, which affords control over the movement of the products 2 by generating forces to counteract the centrifugal force induced by rotation, the device 45 is rendered singularly effective and suitable for aligning any kind of product 2, whether typified by a high coefficient or by a low coefficient of friction. At low angular velocities of the disc 47, in effect, it is the wall 57 that advances and aligns the products 2 whether characterized by a low or by a high coefficient of friction, whilst at high angular velocities of the disc 47 it is the top surface 48 of the disc itself by which the products 2 are invested with forces of a strength sufficient to counteract the centrifugal forces induced by rotation. Even in this instance the products 2 are advanced and aligned by the wall 57 during their passage along the entire length of the path 60, whilst the function of the top surface 48 is to maintain the products 2 in contact with the wall 57.

Consequently, the top surface 48 of the disc 47 might exhibit numerous different embodiments, all of which however will combine with the spiral wall 57 to create a path 60 along which the movement of the products 2 across the disc 47 can be controlled in the manner aforementioned.

Possible embodiments for the top surface 48 of the disc 47 are indicated by way of example in FIGS. 7, 9, 10 and 11.

These embodiments are similar to those for the top surface 4 of the disc 3 illustrated in FIGS. 2, 4, 5 and 6.

Likewise in this version of the aligner device, the top surface 48 of the disc 47 presents at least one portion, denoted 48a, affording an upwardly directed concave profile.

In the example of FIG. 7, the top surface 48 of the disc 47 presents a portion 48b disposed adjacent to the axis of rotation 54, of which the profile appears substantially horizontal and flat. This portion 48b and the upward facing concavely profiled portion 48a are joined with no break in continuity. In this particular example, viewing the disc 47 in a diametral section, the concave portion 48a presents a profile comprising two consecutive rectilinear legs 61' and 61', of which the outer leg 61" is the more steeply angled.

Figure 9:
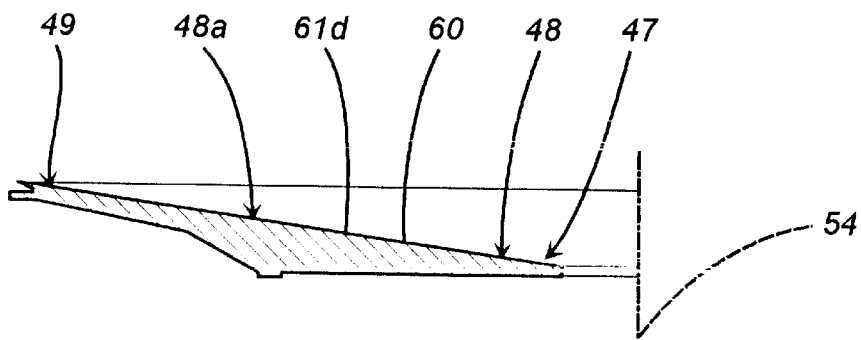
FIGS. 9, 10 and 11 are partial sections showing possible embodiments of a detail of the device as in FIGS. 6, 7 and 8, illustrated by way of example and implying no limitation.
Figure 10:
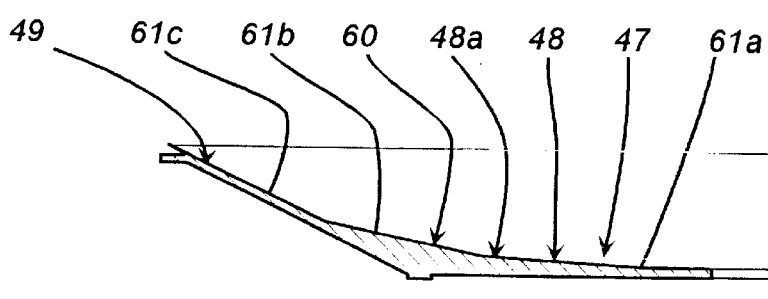

As shown in FIG. 9, the top surface 48 of the disc 47 could also be shaped in such a manner as to present a sectional profile that comprises a single rectilinear leg 61d, angled upwards toward the periphery. In this instance the portion 48a of concave profile occupies substantially the entire top surface 48 of the disc.

In the example of FIG. 10, again viewing the disc 47 in a diametral section, the top surface 48 presents a portion 48a of concave profile comprising a succession of mutually angled rectilinear legs 61a, 61b and 61c. The farther the single rectilinear leg is located from the rotational axis 54 of the disc 47, the steeper the angle of inclination becomes.

Figure 11:
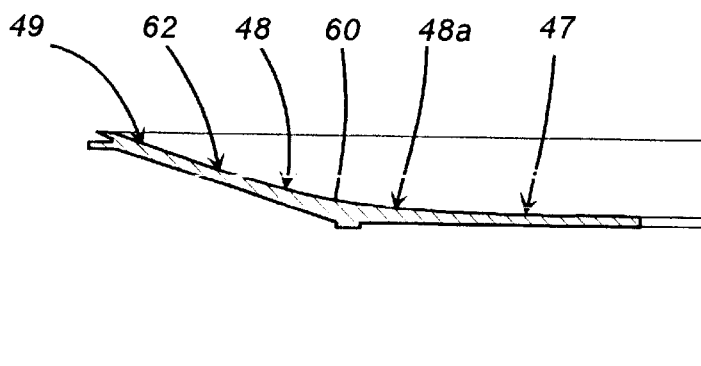

Finally, in the embodiment of FIG. 11, the top surface 48 of the disc 47 comprises a concave portion 48a presenting a profile of which at least one part is a curve 62.

Where the concave portion 48a exhibits a curvilinear profile, the curve 62 can be circular, polycentric, parabolic, elliptical or hyperbolic.

Naturally there are possibilities for numerous other variations in embodiment of the profiles in question, obtainable by combining the essential shapes described and illustrated to suitable advantage.

As to the conveyor means 20, the conveyor belt 22 is shown in FIG. 6 with a transport branch 23 coupled to the outfeed station 56 of the drum 55 in such a way as to enable a smooth take-up of the aligned and oriented products 2 leaving the disc 47.

As indicated in the detail of FIG. 6a, the transport branch 23 of the conveyor belt 22 is angled relative to the peripheral wall 63 of the drum 55, in such a way that products 2 leaving the disc 47 are made to follow an ascending or parabolic path. More exactly, the transport branch 23 of the belt 22 operates with one side edge 24 located permanently between a top extremity 63a of the drum wall 63 and the peripheral portion 49 of the disc 47.

In operation, considering the first version of the aligner device illustrated in FIGS. 1 to 5, a flow of products 2 advancing en masse along the infeed belt 15 is directed onto the top surface 4 of the rotating disc 3.

Under the impetus of the centrifugal force produced by rotation of the disc 3, the products 2 are caused to move at high speed in a radial direction, fanning out toward the periphery of the disc 3 and away from the axis of rotation 5.

Having been distanced from the portion 4b of the top surface 4 lying nearest to the axis of rotation 5, the products 2 advance onto the path 8 and begin climbing progressively toward the peripheral portion 9 of the disc 3. Encountering the upward facing portion 4a of concave profile, the products 2 undergo a reduction in velocity as the directional component of their weight related force is modified by this same portion 4a and tends to counteract the centrifugal force generated in rotation.

Thanks to the decelerating effect of the selectively contoured profile incorporated into the top surface 4 of the disc 3, the products 2 will be directed against the spiral wall 27 and against the lateral surface 35 of the inner annular body 13 (albeit FIG. 1 illustrates a situation in which the products 2 pass directly onto the top annular surface 33 without encountering the lateral surface 35) at an optimum minimal velocity of impact. Thereafter, the products 2 make their ascent along the first circumferential path in conventional manner, arriving ultimately at the outfeed station 26 and onto the lip 17 of the inner annular body 13. From here the products 2 pass through the second junction and out of the drum 25, propelled now by a centrifugal force that remains unopposed, advancing across the top annular surface 44 of the outer annular body 14 and onto the conveyor belt 22. Once on the belt 22, the products 2 are aligned gradually along the middle of the transport branch 23 by contact with the conveying branch 29 of the first belt loop 28, passing thereupon through the runout 32 of the belt 22 and proceeding in ordered succession along the outfeed path 21 toward the manufacturing machine 7. To advantage, as already intimated, the transport branch 23 of the conveyor belt 22 is tilted in such a way as to form a parabolic surface by which the products 2, ejecting from the drum at an appreciable velocity, are cushioned and held correctly on course.

In operation of the second version of the device 1 illustrated in FIGS. 6 to 11, products 2 advancing en masse along the infeed belt 15 are deposited on the top surface 48 of the rotating disc 47 in the region of the discharge point 50.

Subject to the centrifugal force produced by rotation of the disc 47, and the pushing action of the spiral wall 57, the products 2 are directed along the path 60 and away from the axis of rotation 54.

Having been distanced from the portion 48b of the top surface 48 lying nearest to the axis of rotation 54, the products 2 advance along the path 60 and begin the gradual climb toward the peripheral portion 49 of the disc 47. Encountering the upward facing portion 48a of concave profile, the products 2 are decelerated and brought naturally into contact with the wall 57.

Advancing further along the path 60, the products 2 are enabled by the combined actions of the concavely profiled portion 48a and the spiral wall 57 to spread out and align themselves in ordered succession along the path 60, maintaining contact with the wall 57, which also functions as a guide, beyond the peripheral portion 49 of the disc 47 and through to the outfeed station 56. From here, the products 2 pass onto the conveyor belt 22, still carried along by the impetus of centrifugal force and by the action of the wall 57. Once on the belt 22, the products 2 will be aligned gradually along the middle of the transport branch 23 by contact with the conveying branch 29 of the first belt loop 28, passing thereupon through the runout 32 of the belt 22 and proceeding in ordered succession along the outfeed path 21 toward the manufacturing machine 7. To advantage, as already intimated, the transport branch 23 of the conveyor belt 22 is tilted in such a way as to form a parabolic surface by which the products 2, traveling at an appreciable velocity, are cushioned and held correctly on course.

What is claimed:

1. A product aligner device, in particular for items fed to a manufacturing machine, of the type by which a flow of products is received, aligned and oriented and directed toward a manufacturing machine, typically a wrapping machine, comprising:
   a drum, and inside the drum, a disc rotatable about a substantially vertical axis, affording a top surface on which products are taken up and through the agency of centrifugal force aligned and oriented and directed toward an outfeed station;
   infeed means by which the products are deposited on the top surface of the disc; and
   conveyor means affording an outfeed path that extends from the outfeed station toward the manufacturing machine,
   wherein at least one portion of the top surface presented by the disc exhibits an upwardly directed concave profile establishing a path along which the effects of centrifugal force on the products in movement over the top surface are counteracted and controlled, and wherein the upwardly directed concave portion presented by the top surface of the disc exhibits a sectional profile of which at least one part is a curve.

2. A device as in claim 1, wherein the curve is a circumferential arc at least in part.

3. A device as in claim 1, wherein the curve is parabolic at least in part.

4. A device as in claim 1, wherein the curve is elliptical at least in part.

5. A device as in claim 1, wherein the curve is polycentrically curvilinear at least in part.

6. A device as in claim 1, wherein the curve is hyperbolic at least in part.

7. A product aligner device, in particular for items fed to a manufacturing machine, of the type by which a flow of products is received, aligned and oriented and directed toward a manufacturing machine, typically a wrapping machine, comprising:
   a drum, and inside the drum, a disc rotatable about a substantially vertical axis, affording a top surface on which products are taken up and through the agency of centrifugal force aligned and oriented and directed toward an outfeed station;
   infeed means by which the products are deposited on the top surface of the disc; and
   conveyor means affording an outfeed path that extends from the outfeed station toward the manufacturing machine,
   wherein at least one portion of the top surface presented by the disc exhibits an upwardly directed concave profile establishing a path along which the effects of centrifugal force on the products in movement over the top surface are counteracted and controlled, and wherein the upwardly directed concave portion presented by the top surface of the disc exhibits a sectional profile comprising at least a first rectilinear leg, and a second rectilinear leg extending consecutively from and at an angle of inclination steeper than that of the first leg.

8. A product aligner device, in particular for items to manufacturing machine, of the type by which a flow of products is received, aligned and oriented and directed toward a manufacturing machine, typically a wrapping machine, comprising:
   a drum, and inside the drum, a disc rotatable about a substantially vertical axis, affording a top surface on which products are taken up and through the agency of centrifugal force aligned and oriented and directed toward an outfeed station;
   infeed means by which the products are deposited on the top surface of the disc; and
   conveyor means affording an outfeed path that extends from the outfeed station toward the manufacturing machine,
   wherein at least one portion of the top surface presented by the disc exhibits an upwardly directed concave profile establishing a path along which the effects of centrifugal force on the products in movement over the top surface are counteracted and controlled, and wherein the upwardly directed concave portion presented by the top surface of the disc exhibits a sectional profile comprising a succession of mutually angled rectilinear legs of which the respective angles of inclination differ one from the next and become steeper the farther the leg is located from the axis of rotation of the disc.

9. A product aligner device, in particular for items fed to a manufacturing machine, of the type by which a flow of products is received, aligned and oriented and directed toward a manufacturing machine, typically a wrapping machine, comprising:

a drum, and inside the drum, a disc rotatable about a substantially vertical axis, affording a top surface on which products are taken up and through the agency of centrifugal force aligned and oriented and directed toward an outfeed station;

infeed means by which the products are deposited on the top surface of the disc; and conveyor means affording an outfeed path that extends from the outfeed station toward the manufacturing machine, wherein at least one portion of the top surface presented by the disc exhibits an upwardly directed concave profile establishing a path along which the effects of centrifugal force on the products in movement over the top surface are counteracted and controlled, wherein the conveyor means comprise a power driven looped conveyor belt extending along the outfeed path and toward the manufacturing machine, of which a transport branch is coupled to the outfeed station of the drum, wherein the transport branch is angled in relation to the drum in such a way that products passing from the drum out onto the conveyor belt are made to follow an ascending or parabolic trajectory, and further comprising a drum that consists substantially in two annular bodies driven synchronously in rotation about non-parallel axes, of which one annular body is rotatable about an axis angled in relation to the rotational axis of the disc, and affording respective top annular surfaces combining to establish first and second circumferential paths connected one with another and with the outfeed path by way of first and second junctions created as a result of the axial misalignment between the annular bodies, wherein the transport branch of the conveyor belt operates with one side edge located between one top annular surface and a lip projecting radially from the other top annular surface.

10. A product aligner device, in particular for items fed to a manufacturing machine, of the type by which a flow of products is received, aligned and oriented and directed toward a manufacturing machine, typically a wrapping machine, comprising:

a drum, and inside the drum, a disc rotatable about a substantially vertical axis, affording a top surface on which products are taken up and through the agency of centrifugal force aligned and oriented and directed toward an outfeed station;

infeed means by which the products are deposited on the top surface of the disc; and conveyor means affording an outfeed path that extends from the outfeed station toward the manufacturing machine, wherein at least one portion of the top surface presented by the disc exhibits an upwardly directed concave profile establishing a path along which the effects of centrifugal force on the products in movement over the top surface are counteracted and controlled, wherein the conveyor means comprise a first power driven belt loop with a conveying branch suspended above and occupying a plane substantially perpendicular to the transport branch of the conveyor belt in such a way that the two branches can operate in conjunction to align the products along the outfeed path, and wherein the conveyor means comprise a second power driven belt loop with a conveying branch positioned alongside the outfeed path and facing the corresponding branch of the first belt loop.

11. A device as in claim 10, wherein the conveying branches of the first belt loop and the second belt loop are dissimilar in length.

* * * * *